United States Patent [19]

Thompson

[11] 4,189,544
[45] Feb. 19, 1980

[54] POLYISOCYANURATE POLYMERS PREPARED USING CARBAMATE MODIFIER

[75] Inventor: Edward J. Thompson, Watertown, Conn.

[73] Assignee: The Upjohn Company, Kalamazoo, Mich.

[21] Appl. No.: 13,426

[22] Filed: Feb. 21, 1979

[51] Int. Cl.$^2$ ............... C08G 18/14; C08G 18/18
[52] U.S. Cl. ............... 521/128; 428/315; 428/425.8; 521/902; 528/49; 528/52; 528/90
[58] Field of Search ............... 521/128, 902; 528/49, 528/52

[56] References Cited

U.S. PATENT DOCUMENTS

| | | | |
|---|---|---|---|
| 3,294,713 | 12/1966 | Hudson et al. | 528/49 |
| 3,745,133 | 7/1973 | Communale et al. | 521/129 |
| 3,896,052 | 7/1975 | Lockwood et al. | 521/117 |
| 3,896,158 | 7/1975 | Rice | 528/49 |
| 3,899,443 | 8/1975 | Reymore et al. | 521/162 |
| 3,925,527 | 12/1975 | Kleimann et al. | 521/128 |
| 3,986,991 | 10/1976 | Kolakowski et al. | 521/117 |
| 4,077,920 | 3/1978 | Yukuta et al. | 521/128 |
| 4,124,545 | 11/1978 | Hocker et al. | 521/902 |

FOREIGN PATENT DOCUMENTS 822504 10/1959 United Kingdom .
1179231 1/1970 United Kingdom .

*Primary Examiner*—H.S. Cockeram
*Attorney, Agent, or Firm*—James S. Rose; Denis A. Firth

[57] ABSTRACT

Novel cellular and non-cellular polymers are provided in which the major recurring polymer unit is isocyanurate which polymer comprises the reaction product obtained by bringing together an aromatic polyisocyanate, a trimerization catalyst, and a minor amount of a carbamate modifier.

The use of the carbamate modifier allows for the presence of high catalyst levels without shortening the reaction initiation period. At the same time, the resulting cure is very rapid and the extent of cure much deeper than has heretofore been attainable.

14 Claims, No Drawings

POLYISOCYANURATE POLYMERS PREPARED USING CARBAMATE MODIFIER

BACKGROUND OF THE INVENTION

1. Field of the Invention

This invention relates to polyisocyanurate polymers and is more particularly concerned with improved polyisocyanurate foams, films, coatings, and the like.

2. Description of the Prior Art

The trimerization of an excess of organic polyisocyanates with minor amounts of polyhydric alcohols to form polyisocyanurate-polyurethane polymers is well known in the art; see for example U.S. Pat. Nos. 3,745,133, 3,986,991, 3,896,052, and 3,899,443.

When the faster polyurethane forming reaction is combined in the same formation with the slower polyisocyanurate reaction, various types of problems can occur. The prior art has dealt with this problem of unequal reactivity mainly by employing particular catalysts or catalyst combinations for particular tasks; see particularly the last three patents cited supra.

The prior art still suffers from the difficulty of slow overall cure rate at the finish of the polymer forming reaction. If sufficient amounts of catalyst are employed to effect rapid cure a too rapid onset of the polymerization process occurs making handling of the material difficult if not impossible.

It has now been discovered that the trimerization of polyisocyanates in the presence of a minor amount of a carbamate modifier provides polyisocyanurate polymers which have a much more rapid and deeper cure than prior art materials and yet, at the same time, have the same or slower initiation rates.

The carbamate modifiers, because they have no hydroxyl groups to form polyurethanes, allow the presence of catalyst levels, which, surprisingly, can be ten to twenty times the amounts used in conventional trimer-/urethane reactions. The high catalyst level is what gives rise to the very rapid cure out of the polymers in accordance with the present invention.

The polyisocyanurates are characterized by higher percent trimer content than prior art polymers. Unexpectedly, this higher trimer level is reached at lower peak reaction exotherm levels compared to the prior art polymers.

In a further advantage to flow from the present invention, there is superior processing latitude in the present polymers compared to the prior art materials.

SUMMARY OF THE INVENTION

This invention comprises a polymer in which the major recurring unit is isocyanurate which polymer comprises the reaction product obtained by bringing together an aromatic polyisocyanate, and a trimerization catalyst, the improvement which comprises incorporating into said polymer a minor amount of a carbamate modifier selected from the group consisting of

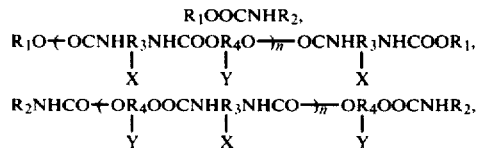

and mixtures thereof; wherein $R_1$ and $R_2$ each independently represents hydrocarbyl; $R_3$ is a polyvalent hydrocarbon radical; $R_4$ is a polyvalent organic radical; n has an average value from 0 to 10; X represents

and Y represents

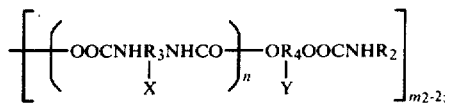

wherein n is defined above, and $m_1$ and $m_2$ represent the valencies of $R_3$ and $R_4$ respectively.

The value of $m_1$ and $m_2$ determines if branching or cross-linking occurs in the compounds of (II) or (III). When $m_1$ or $m_2$ is 2 then no branching occurs as defined by the expression $m_1-2$ and $m_2-2$ in X and Y above.

The invention also comprises the cellular polyisocyanurates arising from the preparation of the above polymers in the presence of blowing agents.

The invention also comprises film or coating compositions comprising the above polymers.

The invention also comprises the molded compositions derived from the above polymers.

The term "hydrocarbyl" means the monovalent radical obtained by removing one hydrogen atom from the parent hydrocarbon having from 1 to 18 carbon atoms. Illustrative of hydrocarbyl are alkyl such as methyl, ethyl, propyl, butyl, pentyl, hexyl, octyl, decyl, dodecyl, hexadecyl, octadecyl, and the like, including isomeric forms thereof; alkenyl such as allyl, butenyl, pentenyl, hexenyl, octenyl, decenyl, undecenyl, tridecenyl, hexadecenyl, octadecenyl, and the like, including isomeric forms thereof; aralkyl such as benzyl, phenethyl, phenylpropyl, benzhydryl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl and the like including isomeric forms thereof; and cycloalkenyl such as cyclopentenyl, cyclohexenyl, cycloheptenyl, cyclooctenyl, and the like, including isomeric forms thereof.

The hydrocarbyl groups can be substituted by one or a plurality of substituents provided the latter are not reactive with isocyanate groups. Illustrative of such substituents are halo, i.e. chloro, bromo, fluoro, and iodo; nitro; alkoxy from 1 to 8 carbon atoms, inclusive, such as methoxy, ethoxy, propoxy, butoxy, pentyloxy, hexyloxy, heptyloxy, octyloxy and the like, including isomeric forms thereof; monoalkyl ethers of a polyalkyleneoxy radical having a molecular weight from about 200 to about 750, wherein the monoalkyl ether groups have the same definition as alkoxy above; and monoaryl ethers of a polyalkyleneoxy radical having a molecular weight from about 140 to about 600 wherein the monoaryl ether has from 6 to 12 carbon atoms, inclusive, such as phenoxy, p-methylphenoxy, naphthoxy, and the like.

The term "polyvalent hydrocarbon radical" means the divalent, trivalent, tetravalent, pentavalent, hexavalent, heptavalent, and octavalent radical obtained by removing two, three, four, five, six, seven or eight hydrogen atoms from the parent hydrocarbon having a carbon atom content of from 6 to 36, inclusive. The term "parent hydrocarbon" has the same significance as used in defining "hydrocarbyl" above except for the difference in the number of hydrogen atoms removed and the difference in the carbon atom limitations. Included in this definition is alkylene, phenylene, tolylene, xylylene, naphthylene, diphenylylene, and radicals having the formula

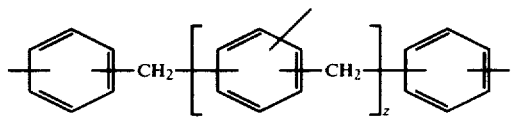

wherein z is 0 or a number having an average value from 0 to 1.

The term "polyvalent organic radical" means the divalent, trivalent, tetravalent, pentavalent, hexavalent, heptavalent, and octavalent radical obtained by removing the two, three, four, five, six, seven, or eight hydroxyl groups from the corresponding organic polyols having a molecular weight of from about 60 to about 5000 such as polyether polyols, polyester polyols, aliphatic polyols, aromatic polyols, nitrogen containing aliphatic or aromatic polyols, cycloaliphatic polyols, and the like.

Preferred amongst the carbamate modifiers in accordance with the present invention are those having the formula (II) defined above. Preferred members of this class (II) are (a) those having n=0 and the value of $m_1$ is 2; and (b) those of formula (II) wherein n has an average value of from about 0.5 to about 5 and the value of both $m_1$ and $m_2$ is 2; and mixtures of (IIa) and (IIb).

Of the polyvalent hydrocarbon radicals $R_3$, preferred are the aromatic polyvalent radicals, and most preferred are the aromatic divalent radicals.

Of the polyvalent organic radicals $R_4$, preferred are the polyvalent polyalkyleneoxyalkyl radicals, and most preferred are the divalent polyalkyleneoxyalkylene radicals.

The carbamate modified polyisocyanurates can be used to prepare cellular materials, films, coatings, moldings, and the like.

Polyisocyanurate cellular materials, or foams, are well known for their heat and fire resistance and are used in making laminate boards and foam bun stock which are both used in building construction for thermal and sound insulation.

The films and coatings can be used for applying protective coatings to sheet metals such as zinc, aluminum, steel, and the like, especially electrical control boxes and appliances requiring a coating which will withstand relatively high temperatures.

The moldings can be used in the form of potting compounds for electrical components, rheostat pots, and the like.

DETAILED DESCRIPTION OF THE INVENTION

The novelty of the present invention resides in the incorporation of a minor amount of a carbamate modifier defined hereinabove into the polymer forming ingredients comprising the aromatic organic polyisocyanate, trimerization catalyst, and any other optional adjuvants conventionally employed in the preparation of polyisocyanurate polymers.

The carbamate modifiers can be assigned a calculated carbamate equivalent weight which is simply defined by the following equation.

$$\text{carbamate equiv. wt.} = \frac{\text{mol. wt.}}{\text{No. of carbamate groups per mole}}$$

The optimum quantity of carbamate modifiers to be employed in preparing the polyisocyanurate polymers in accordance with the present invention is easily determined by simple trial and error. Advantageously, the modifiers are used within a range of from about 0.02 to about 0.5 carbamate equivalent per equivalent of polyisocyanate employed, preferably from about 0.1 to about 0.25 carbamate equivalent per equivalent of polyisocyanate.

Although not essential, it is preferable for ease of handling that the carbamate modifiers be liquids, or alternatively, easily liquefied by heating. Generally speaking, the molecular weight of the carbamate modifier falls within the range of from about 150 to about 6000.

The carbamate modifiers defined by the formulae (I–III) above are readily prepared using any convenient means for the preparation of carbamate linkages known to those skilled in the art.

Typically, the carbamate modifiers are derived from the reaction of a hydroxyl compound (or chloroformate derivative thereof) with an isocyanate (or corresponding amine thereof) provided the total equivalents of hydroxyl (or chloroformate) and total equivalents of isocyanate (or amine) are in essentially equal proportions so that the product be essentially free of isocyanate and hydroxyl groups or chloroformate and amine groups. Preferably, the carbamates are prepared by reacting hydroxyl compounds with isocyanates.

The carbamate modifiers defined by (I) are readily prepared in accordance with the following equation by the reaction of a monohydric alcohol with a monoisocyanate

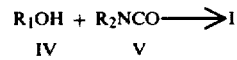

wherein $R_1$ and $R_2$ are defined as above.

Carbamate modifiers having the formula (II) wherein n=0, and X is non-existent, that is to say, $m_1$ is two so there is no branching or cross-linking, are readily prepared in accordance with the following equation,

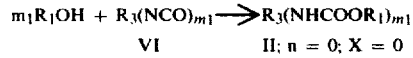

wherein $m_1$, $R_1$, and $R_3$ are defined above.

Similarly, the carbamate modifiers (III) wherein n=0 and Y is non-existent are prepared in accordance with the following equation,

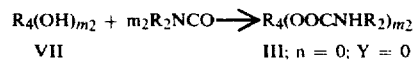

wherein $m_2$, $R_2$, and $R_4$ are defined above.

In the case of the carbamate modifiers (II) and (III) wherein the average value of n is greater than zero, it will be obvious to one skilled in the art that a polyhydric alcohol and a polyisocyanate cannot be reacted together in equivalent amounts as the sole reactants without excessive polymer formation or gelation occurring. Accordingly, either the polyhydric alcohol or polyisocyanate must be used in excess of one over the other with the resultant hydroxyl or isocyanate terminated prepolymer being capped by the monoisocyanate or monohydric alcohol respectively.

Accordingly, the carbamates of formula (II) are prepared in accordance with the following equation,

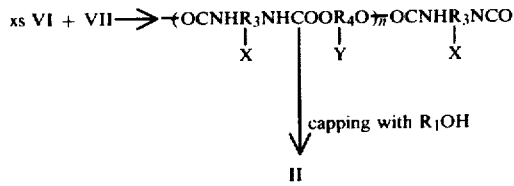

and the carbamates of formula III by the following equation,

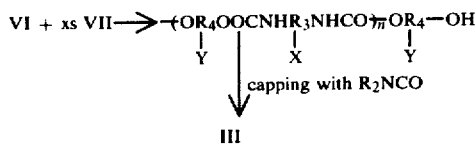

wherein the X and Y are defined above with the exception that prior to the capping reactions, and, if X and Y are greater than O, X and Y have terminal groups of NCO and OH respectively which then are converted by the capping reactions to the X and Y defined hereinbefore.

In the simplest embodiment of (II) and (III) the three ingredients, namely, the polyhydric alcohol, the polyisocyanate, and either the monohydric alcohol or monoisocyanate are reacted in a one-shot procedure. an isocyanate or hydroxyl terminated prepolymer is prepared which is then capped with the appropriate monofunctional isocyanate or alcohol. For a detailed teaching of the method of urethane or carbamate forming reactions and prepolymer urethane forming reactions from alcohols and isocyanates see Saunders and Frisch, Polyurethanes: Chemistry and Technology Part I 1962, and Part II 1964, Interscience Publishers, New York, N.Y.; see Preparative Methods of Polymer Chemistry by Sorenson et al, p 152 (1968) Interscience Pub., New York, N.Y. for typical urethane formation from chloroformates and amines.

The completion of the reaction is easily determined using any appropriate analytical method for the determination of either the isocyanate group or hydroxyl group and the absence thereof. A particularly effective method is the infrared absorption analysis for the isocyanate or hydroxyl group. The carbamate equivalent weight can be simply determined by dividing the combined weight of the alcohol-isocyanate components by the total number of equivalents of alcohol or total number of equivalents of isocyanate used.

The monohydric alcohols (IV) which have $R_1$ groups falling within the definition set forth above in accordance with the present invention are any of the organic monohydric primary or secondary alcohols having a molecular weight falling within a range of from about 32 to about 1000 and preferably from about 80 to about 750. Included in this class are aliphatic alcohols, phenols, alicyclic alcohols, monoalkyl ethers of glycols, monoalkylethers of polyalkyleneoxy glycols, monoaryl ethers of polyalkyleneoxy glycols, monoalkyl ethers of dihydric phenols, and the like.

Particularly preferred members of this class of monohydric alcohols are the monoalkylethers of glycols, and the monoalkylethers of polyalkyleneoxy glycols.

Preferred species of (IV) include the monomethyl-, monoethyl-, and monobutyl ethers of ethylene glycol, the monomethyl-, monopropyl-, and monobutyl ethers of propylene glycol, the monomethyl-, monoethyl-, and monobutyl ethers of diethylene glycol, the monomethyl ether of dipropylene glycol, and the monomethyl ethers of the polyethyleneoxy glycols having a molecular weight from about 350 to about 750.

The polyhydric alcohols VII which have an $R_4$ polyvalent organic radical falling within the above definition are any of the organic primary or secondary alcohols having a functionality of from 2 to 8, preferably from 2 to 3, and most preferably 2 and further characterized by having a molecular weight of from about 60 to about 5000, preferably from about 150 to about 4000.

Included in this class are the polyhydric alcohols disclosed in U.S. Pat. No. 3,745,133, column 9, line 60 to column 10, line 70 and whose disclosure with respect to said polyhydric alcohols is incorporated by reference herein. Also included are the polybutadiene resins containing hydroxyl groups.

A most preferred class of polyhydric alcohols are the polyalkyleneoxy glycols including the polyethyleneoxy and polypropyleneoxy glycols falling within a molecular weight range of from about 200 to about 3000 and preferably about 500 to about 3000.

The isocyanates (V) and (VI) having $R_2$ and $R_3$ radicals in accordance with the definitions set forth above can be any of the organic mono- and polyisocyanates known to those skilled in the art having the carbon atom content set forth above. The polyisocyanates have a functionality of from about 2 to about 8.

Preferred are the aromatic isocyanates and most preferred are the aromatic polyisocyanates.

Illustrative of the monoisocyanates are the following: hexyl isocyanate, decyl isocyanate, cyclohexyl isocyanate, phenyl isocyanate, p-methylphenyl isocyanate, p-ethylphenyl isocyanate, p-bromophenylisocyanate, 2,4,6-tribromophenylisocyanate.

Illustrative examples of the polyisocyanates are: hexamethylene diisocyanate, 4,4'-methylenebis(cyclohexylisocyanate, m-phenylenediisocyanate, p-phenylenediisocyanate, 1,5-naphthalenediisocyanate, biphenyl-4,4'-diisocyanate, 4,4'-methylenebis(phenyl isocyanate), 2,4-toluenediisocyanate, 2,6-toluenediisocyanate, and mixtures thereof; the polymethylene polyphenyl polyisocyanates, particularly those set forth in U.S. Pat. No. 3,745,133 whose disclosure with respect to said isocyanates is incorporated by reference herein. A particularly preferred group of VI consists of 4,4'-methylenebis(phenyl isocyanate), liquefied methylenebis(phenyl isocyanates) of either the 4,4'-isomer or mixtures of the 4,4'-isomer and the 2,4'-isomer described in U.S. Pat. No. 3,745,133 cited supra, 2,4- and 2,6-toluenediisocyanates, and mixtures thereof, and polyisocyanate mixtures containing from about 30 percent to about 85 percent by weight of methylenebis(phenyl isocyanate) and the remainder of said mixture comprising polymethylene polyphenyl polyisocyanates of functionality higher than 2.0.

The organic polyisocyanates which can be trimerized to the polyisocyanurate resins in accordance with the present invention can be any of the aromatic polyisocyanates conventionally employed in the art for this purpose previously including those aromatic polyisocyanates listed above having at least two isocyanate groups. Advantageously, and in order to obtain resins or foams having exceptionally high heat resistance and structural strength, the preferred polyisocyanates are the polymethylene polyphenylisocyanates noted above, and, particularly preferred, those polyisocyanate mixtures also noted above which contain from about 30 to about 85 percent by weight of methylenebis(phenyl isocyanate); the remainder of said mixture comprising polymethylene polyphenyl polyisocyanates of functionality higher than 2.0.

The trimerization catalyst employed can be any catalyst known to those skilled in the art which will catalyze the trimerization of an organic isocyanate compound to form the isocyanurate moiety. For typical isocyanate trimerization catalysts see The Journal of Cellular Plastics, November/December 1975, page 329; U.S. Pat. Nos. 3,745,133, 3,896,052, 3,899,443, 3,903,018, 3,954,684, and 4,101,465, the disclosures of these references being hereby incorporated by reference herein.

Typical catalyst classes are the glycine salts and alkali metal carboxylic acid salts disclosed in U.S. Pat. No. 4,101,465 cited supra and the mixtures of these two types of catalysts. Preferred species within the classes are sodium N-(2-hydroxy-5-nonylphenyl)methyl-N-methylglycinate, potassium 2-ethylhexanoate, and mixtures thereof.

The total quantity of catalyst, including mixtures of catalysts, in parts by weight per equivalent of polyisocyanate can be easily determined by trial and error for any formulation in accordance with the present invention. Advantageously, the catalyst can be employed from within a range of from about 0.1 parts to about 20 parts by weight per equivalent of polyisocyanate, preferably, from about 0.5 parts to about 10 parts.

A surprising result of the present invention is the large level of catalyst which can be employed without undue decrease in the initiation time of the trimerizing reaction. In most cases, the initiation times are slower in comparison to the prior art. As a result of the higher catalyst levels, the cure rates and the isocyanurate content of the products are both higher than prior art products. Generally speaking, the reaction exotherms of the products of the present invention are lower than prior art polyisocyanurates nowithstanding the higher catalyst levels employed.

As an added advantage to flow from the slower initiation, more time is available between the mixing of the ingredients and the initiation of the reaction, which, in turn, allows for more flexibility in the manipulation before foaming, casting, coating, molding, or whatever of the polyisocyanurate being produced.

In carrying out the preparation of the polyisocyanurate foams in accordance with the present invention, the procedures and equipment conventional in the art are employed; see for example the U.S. patents cited supra.

Foaming agents, and other optional additives such as dispersing agents, cell stabilizers, surfactants, flame retardants, and the like, can be employed according to the teachings of the incorporated references. A preferred class of flame retardant additives is the phosphorus containing flame retardants such as: tris(2-chloroethyl)phosphate, tris(2-chloropropyl)phosphate, tris(2,3-dibromopropyl)phosphate, tris(1,3-dichloroisopropyl)-phosphate, and the like.

The foaming agents employed can be any of the volatile solvents usually employed in the preparation of cellular plastics such as the lower molecular weight halogenated aliphatic hydrocarbons and water; see U.S. Pat. No. 3,745,133, column 11, lines 21 to 45 inclusive for more detailed teaching on blowing agents.

Surprisingly, the water blown high density polyisocyanurate foams in accordance with the present invention are characterized by an unusually quick firm time (see Example 4 below). Comparable high density water blown polyurethanes are not firm until at least 8 minutes.

Non-cellular polymers can also be made in accordance with the present invention using standard techniques known to those skilled in the art either in the presence or absence of solvents. The polymers are obtained by carrying out the trimerization of a polyisocyanate using the same reactants employed in the cellular polymers but in the absence of the blowing agent. The reactants can be cast, molded, coated, or otherwise deposited by methods known to those skilled in the art, to form a solid polyisocyanurate casting, molding, coating, or other form of solid polyisocyanurate.

The technique of reaction injection molding (RIM) or high pressure mixing is particularly useful in the preparation of polyisocyanurates in accordance with the present invention.

If solvent be present it is easily removed under atmospheric pressure or under vacuum, by baking or otherwise heating which also aids in curing the polymer.

Particularly preferred forms of the non-cellular polymers in accordance with the present invention are the film or coating compositions and molded compositions.

In preparing coating compositions in accordance with the present invention the carbamate modifier, trimer catalyst, and solvent form a stable solution. To this stable solution can be added paint additives such as pigments, fillers, flow control agents, flame retardants, and any other additives which are stable towards free isocyanate groups. The additives can be incorporated into the solution using techniques well known to those skilled in the paint industry such as high speed dispersion mixers, sand milling, paint mills and the like.

The polyisocyanate can be added to the stable solution in any suitable container just before the application of the coating solution. Pot life of the coating solution is governed by such factors as the activity and concentration of the catalyst, the solvent concentration, the temperature (both of the solution and substrate to be coated), and the like. The coating solution can then be brushed, rolled, sprayed and the like onto the surface to be coated.

Alternatively, the stable solution of carbamate modifier, solvent, and catalyst, can be mixed continuously with the polyisocyanate at the proper ratio immediately before application using plural component spray equipment.

The coated article is then subjected to a drying and curing step. Preferably, complete solvent removal is effected under elevated temperature conditions which also ensures maximum polymer cure and thereby maximum coating toughness and adhesion to the substrate. Most preferably, the coated article is subjected to both an elevated temperature and a positive flow of air or inert atmosphere such as nitrogen.

Cure temperatures are not critical and can very from about 20° C. to about 120° C. The concentration of polymer forming ingredients is in no way critical and can vary from about 30% to about 90% by weight based on the total weight of ingredients and solvent.

Typical solvents which may be used include aromatic solvents such as benzene, toluene, xylene, and the like; aliphatic ketones such as acetone, methyl ethyl ketone, and the like; dipolar aprotic solvents such dimethylformamide, dimethyl acetamide, dimethyl sulfoxide, tetramethylene sulfone, and the like, and mixtures of any of the above.

The following examples describe the manner and process of making and using the invention and set forth the best mode contemplated by the inventors of carrying out the invention but are not to be construed as limiting.

EXAMPLE 1

The following experiment sets forth a comparison of a polyisocyanurate foam made in accordance with the invention (Foam C) with two polyisocyanurate foams (Foams A and B) not so made.

The foams were prepared as hand-mix samples by blending together the ingredients (in parts by weight) set forth in Table I below, in 1 qt. cups. The blending operation was carried out by thoroughly mixing the ingredients with a high speed drill press motor equipped with a stirrer blade for a standard 10 second period. The mixture was rapidly poured into a ½ gal. tub and allowed to rise freely.

Foam A employed, as the polyisocyanate component, an isocyanate terminated prepolymer (Prepol A) prepared by prereacting a polyoxyethylene glycol of M.W. 400 with a polymethylene polyphenylisocyanate mixture (Polyisocyanate I) containing about 50 percent by weight of methylenebis(phenyl isocyanate) with the remainder comprising polymethylene polyphenylisocyanates of functionality higher than 2.0. The diol and polyisocyanate were reacted in the proportions of 30 parts (0.15 equiv.) of the former with 134 parts (1.0 equiv.) of the latter.

Foam B employed the same polymethylene polyphenylisocyanate and polyoxyethylene glycol used in preparing the prepolymer in Foam A, without prereacting them to the prepolymer.

Foam C contained, in addition to the polymethylene polyphenylisocyanate component, 60 parts of a Carbamate A corresponding to formula (III) above wherein $n=0$, and $m_2=2$, and wherein $R_2$ is p-bromophenyl and $R_4$ corresponds to the divalent polyethyleneoxyethylene radical having the formula $+CH_2CH_2O)_{7.7}CH_2CH_2-$ and prepared by mixing together in the following proportions 60 g. of the same polyoxyethylene glycol used above, and 60 g. of para-bromophenyl isocyanate. The urethane product had a calculated carbamate equivalent weight of 400.

A comparison of the rise characteristics shows how Foam C in accordance with the invention has a very long initiation time in comparison to Foam B even though it has a much higher level of Catalyst I. Yet the rise, and especially the tack free time, are just as fast if not faster than Foam B. Foam A with the isocyanate prepolymer, at the same catalyst levels as Foam C, does not cure out properly. Additionally, the cure out of Foam B, even though the foam exotherm was 310° F. 2 minutes after rise, was not complete. Comparatively, Foam C had a lower exotherm at 292° F. 4 minutes after rise with proper cure, and the % trimer content was higher at 15.8% over either Foam A or B.

TABLE I

| Foams | A | B | C |
|---|---|---|---|
| Ingredients (parts by wt.) | | | |
| Component A: | | | |
| Prepol A | 164 | | |
| Polyisocyanate I | | 134 | 134 |
| Polyoxyethylene glycol (MW 400) | | 30 | |
| Carbamate A (eq.) | | | 60(0.15 eq.) |
| Monofluorotrichloromethane | 32 | 32 | 32 |
| L-5340[1] | 1.0 | 3.0 | 3.0 |
| Component B: | | | |
| Catalyst I[2] | 2.0 | 0.3 | 2.0 |
| Catalyst II[3] | 2.0 | 2.0 | 2.0 |
| L-5340 | 4.0 | — | — |
| Foam Rise Characteristics: (minutes:seconds) | | | |
| cream | :25 | :12 | :27 |
| initiation | :34 | :19 | :37 |
| second initiation | 1:22 | :53 | :60 |
| rise | 2:15 | 1:15 | 1:24 |
| tack free | 5:30 | 2:00 | 1:24 |
| | after 10 mins. foam surface still soft | after 8 mins. foam sides still tacky. surface gummy | — |
| Foam exotherm, °F. (minutes after rise) | 236(4) | 310(2) | 292(4) |
| Density, pcf. | | | 2.25 |
| Oxygen index[4] | | | 27.9 |
| Friability(% wt.loss)[5] | | | 32.3% |
| % Trimer content[6] | 11.2 | 13.0 | 15.8 |

Footnotes to Table I:
[1]L-5340 is a Union Carbide silicone surfactant for rigid urethane foams; see Bulletin F-42172A, October 1970, viscosity of about 1,000 cstk. at 25° C.
[2]Catalyst I is a 67% w/w solution of potassium 2-ethyl-hexanoate in polypropylene glycol 400 M.W.
[3]Catalyst II is a 50% w/w solution of sodium N-(2-hydroxy-5-nonylphenyl)methyl-N-methylglycinate in diethylene glycol.
[4]Oxygen index is a flammability test in accordance with the ASTM D-2863 procedure and reported as the percent oxygen content required to sustain sample combustion.
[5]Friability is the percent sample weight loss over a 10 minute period and determined in accordance with ASTM Test method C-421.
[6]% Trimer Content was determined from the absorbance ratio of the infrared peaks at 1410 cm[-1] and 1510 cm[-1] which represent characteristic peaks for the isocyanurate ring (the 1,3,5-triketohexahydrotriazine ring) and an aromatic ring absorption as an internal standard. The method is based on the model compound of triphenylisocyanurate so the maximum % trimer content attainable at complete conversion would be 35.3% (the wt. % isocyanurate ring content of the model triphenylisocyanurate).

EXAMPLE 2

The following experiment sets forth a comparison of three polyisocyanurate foams (Foams E, F, and G) made in accordance with the invention with Foam D not in accordance with the invention.

The foams were prepared according to the procedure and apparatus set forth in Example 1 using the ingredients set forth in Table II below. The polyisocyanate and catalyst components were identical to those set forth in Example 1.

The Carbamate B component corresponds to formula (I) above wherein $R_1$ is the monovalent radical $CH_3(OCH_2CH_2)_{7.5}$ and $R_2$ is phenyl and was prepared by mixing 292 g. (0.8 equiv.) of a monomethyl ether of polyethylene glycol of MW 350 and 95.2 g. (0.8 equiv.) of phenyl isocyanate together with 2 drops of dibutyltin dilaurate and keeping the mixture in an oven at 80° C. for 30 minutes. The urethane product had a calculated carbamate equivalent weight of 484. Foams E, F, and G contained decreasing amounts of Carbamate B while Foam D contained none of this ingredient.

The cure rates are unusually fast after long initiation times for Foams E, F, and G. Furthermore, when compared to Foam D, the Foams E, F, and G all had higher trimer content even though they all contained the same catalyst concentrations except Foam F which did have a lower level of Catalyst II. In spite of this catalyst difference, Foam F still had a higher trimer content than Foam D.

TABLE II

| Foams | D | E | F | G |
|---|---|---|---|---|
| Ingredients (parts by wt.) | | | | |
| Polyisocyanate I | 134 | 134 | 134 | 134 |
| Carbamate B (equivs.) | 0 | 121.5(0.25) | 50(0.10)* | 10(0.02) |
| monofluorotrichloromethane | 21.5 | 42 | 33 | 24 |
| L-5340 | 3.0 | 3.0 | 2.0 | 3.0 |
| Catalyst I | 2.0 | 2.0 | 2.0 | 2.0 |
| Catalyst II | 2.0 | 2.0 | 1.0 | 2.0 |
| Foam Rise Characteristics: (minutes:seconds) | | | | |
| cream | :10 | :40 | :18 | :10 |
| initiation | :20 | :40-1:30 | :22 | :20 |
| second initiation | :45 | 2:00 | :49 | :25 |
| gel | — | 2:10 | :56 | — |
| rise | :75 | 2:30 | :75 | :30-:35 |
| tack free | — | 2:50 | :68 | — |
| | surface still tacky after 15 mins. | foam soft after 4:00 some shrinking | foam firm at rise | — |
| % trimer content | 12.6 | 25.0 | 18.3 | 12.9 |

*Contains added 0.6 g. (0.005 eq.) of 4,4'-methylenebis-(phenyl isocyanate) to offset slight excess monomethyl ether of polyethylene glycol MW 350 in this particular Carbamate B sample.

EXAMPLE 3

Using the procedure and apparatus set forth in Example 1 and the ingredients set forth in Table III below, the following five foams H through L were prepared in accordance with the present invention. The foams differed either in the carbamate ingredient employed or else in the catalyst concentration employed.

Carbamate C corresponds to formula III above wherein $n=0$, $m_2$ is 2, $R_2$ is phenyl, and $R_4$ corresponds to the divalent polypropyleneoxypropylene radical having the formula $-(CH_2CHCH_3O)_6CH_2CHCH_3-$ and was prepared by mixing together in the following proportions 119 g. (1.0 equiv.) of phenyl isocyanate, an 225 g. (1.02 equiv.) of a polypropylene glycol of MW 425 with 4 drops of dibutyltin dilaurate and keeping the mixture in an oven at 200° F. for 4 hours. The urethane product had a calculated carbamate weight of 344.

Carbamate D corresponds to formula (II) above wherein n is 0, $m_1$ is 2, $R_1$ is the monovalent radical $CH_3(OCH_2CH_2)_{7.5}$, and $R_3$ is the 1-methyl-2,4-phenylene radical and was prepared by mixing together in the following proportions 353 g. (1.0 equiv.) of a monomethyl ether of polyethylene glycol of MW 350, and 87 g. (1.0 equiv.) of 2,4-toluene diisocyanate with 3 drops of dibutyltin dilaurate. The urethane product had a calculated carbamate equivalent weight of 440.

Carbamate E corresponds to formula (II) above wherein n is 0, $m_1$ is 2, $R_1$ is the monovalent radical $CH_3(OCH_2CH_2)_{7.5}$, and $R_3$ is the 4,4'-methylenebis(-phenylene)radical and was prepared by mixing together in the following proportions 353 g. (1.0 equiv.) of a monomethyl ether of polyethylene glycol of MW 350, and 125 g. (1.0 equiv.) of 4,4'-methylenebis(phenyl isocyanate) with 4 drops of dibutyltin dilaurate and keeping the mixture in an oven at 180° F. for 120 minutes. The urethane product had a calculated carbamate equivalent weight of 478.

Carbamate F corresponds to formula (I) above wherein $R_1$ is the monovalent radical $CH_3(OCH_2CH_2)_{12}$ and $R_2$ is phenyl and was prepared by mixing together in the following proportions 345 g. (0.6 equiv.) of a monomethyl ether of polyethylene glycol of MW 550, and 71.4 g. (0.6 equiv.) of phenyl isocyanate with 2 drops of dibutyltin dilaurate in an oven at 180° F. for 30 mins. The urethane product had a calculated carbamate equivalent weight of 694.

All of the foams were characterized by a remarkably rapid cure, as reflected in rise and tack free time, in relation to such a slow initiation time relative to the cure out. The % trimer content was high and density easily controllable to a 2 pcf level in all samples. Foams I and J show the control which can be effected over rise characteristics through a variation in catalyst concentration.

TABLE III

| Foams | H | I | J | K | L |
|---|---|---|---|---|---|
| Ingredients(parts by wt.) | | | | | |
| Polyisocyanate I | 134 | 134 | 134 | 134 | 134 |
| Carbamate C (eq) | 51 (0.15 eq) | | | | |
| Carbamate D (eq) | | 51 (0.12 eq) | 50 (0.11 eq) | | |
| Carbamate E (eq) | | | | 50 (0.10 eq) | |
| Carbamate F (eq) | | | | | 25 (0.03 eq) |
| Monofluorotrichloromethane | 32 | 32 | 32 | 32 | 16 |
| L-5340 | 2.0 | 2.0 | 1.0 | 2.0 | 1.0 |
| Catalyst I | 4.0 | 4.0 | 2.0 | 2.0 | 1.0 |
| Catalyst II | 2.0 | 2.0 | 1.0 | 1.0 | 0.5 |
| Foam Rise Characteristics: (minutes:seconds) | | | | | |
| cream | :20 | :06 | :13 | :13 | :06 |
| initiation | :25 | :08 | :15 | :20 | :13 |
| second initiation | 1:05 | — | :40 | :45 | :40 |
| gel | 1:20 | — | — | :55 | — |

TABLE III-continued

| Foams | H | I | J | K | L |
|---|---|---|---|---|---|
| rise | 1:30 | 15 sec. | :50 | :67 | :58 |
| tack free | 2:00 | — | :65 | at rise | — |
| Density, pcf. | 1.84 | 2.02 | 2.19 | 2.00 | 1.89 |
| % trimer content | 15.2 | 16.7 | 14.3 | 13.8 | 16.8 |

EXAMPLE 4

The following experiment sets forth five water blown molded high density foams (M through Q inclusive) prepared in accordance with the present invention.

The foams were prepared by first blending together in a paper cup the carbamate, catalyst, surfactant, and water, in the proportions set forth in Table IV. The polyisocyanate was mixed vigorously into the blend for about 10 seconds using a drill press motor equipped with an agitator blade. The contents of the cup were then poured into a weighed 600 ml. polyethylene beaker having volumetric graduation marks on the side. During the course of the reaction in the beaker the volume versus time was recorded. At the end of the reaction the beaker was weighed and the density versus time data as set forth in Table IV was calculated.

The time-density data shows clearly that an unusually quick firm time (3 to 5 minutes) is attained for a water blown system. Comparable high density water blown polyurethanes with similar rise profiles are not firm until at least 8 minutes after mixing the ingredients.

TABLE IV

| Foams | M | N | O | P | Q |
|---|---|---|---|---|---|
| Ingredients(parts by wt.) | | | | | |
| Polyisocyanate I | 50 | 50 | 50 | 50 | 50 |
| Carbamate F | 25(0.04 eq.) | 25(0.04 eq.) | | | |
| Carbamate D | | | 25(0.06 eq.) | 25(0.06 eq.) | |
| Carbamate C | | | | | 25(0.07 eq.) |
| Water(no. of drops) | 7 | 4 | 4 | 4 | 7 |
| L-5340 | 0.5 | 0.5 | 0.5 | 0.5 | 0.5 |
| Catalyst I | 0.7 | 0.7 | 0.5 | 0.7 | 0.7 |

Density(pcf)profile with time (minutes:seconds) after mix:

| Time | Density | Time | Density | Time | Density | Time | Density | Time | Density |
|---|---|---|---|---|---|---|---|---|---|
| :22 | 35.8 | :15 | 35.6 | :17 | 43.4 | :30 | 50.5 | :20 | 42.8 |
| :29 | 29.8 | :22 | 32 | :24 | 34.8 | 1:07 | 37.9 | :27 | 34.3 |
| :40 | 25.5 | :32 | 26.7 | :36 | 29 | 2:12 | 30.3 | :35 | 28.5 |
| :50 | 22.3 | :45 | 22.9 | :51 | 24.8 | 3:00 | 25.3 second initiation | :45 | 24.5 |
| :63 | 19.9 | :63 | 20.0 | 1:13 | 21.7 | | | | |
| 1:20 | 17.9 | 1:25 | 17.8 | 1:44 | 19.3 | 3:30 | rise | 1:12 | 19.0 |
| 1:40 | 16.3 | 1:30 | second initiation | 2:00 | 18.3 second initiation | 4:00 | 19.0 firm | 1:27 | 17.1 |
| | | | | | | | | 1:48 | 15.6 |
| 1:55 | 15.5 | 1:45 | rise | 2:33 | rise | | | 2:15 | 14.3 |
| 2:13 | 14.9 | 3:00 | 10.3 firm | 2:30 | tack free | | | 2:45 | 13.2 |
| 2:27 | 14.3 | | | 3:30 | 10.9 firm | | | 3:15 | 12.2 second initiation |
| 2:35 | second initiation | | | | | | | 3:50 | gel |
| 3:00 | rise (tack free) | | | | | | | 4:00 | tack free |
| 4:15 | sides of cup moving | | | | | | | 5:00 | 8.2 firm |
| 5:00 | 8.33 firm | | | | | | | | |

EXAMPLE 5

Using the procedure and apparatus set forth in Example 4 the following two high density water blown Foams R and S in accordance with the present invention were prepared using the ingredients set forth in Table V.

The Carbamate G corresponds to a mixture of carbamates comprising (a) the carbamate of formula (II) above wherein n is 0 and $m_1$ is 2; and (b) the carbamate of formula (II) above wherein n has an average value of about 1.5, $m_1$ and $m_2$ are both 2, $R_1$ in both (a) and (b) is the monovalent radical $CH_3OCHCH_3OCH_2CHCH_3-$, $R_3$ in both (a) and (b) is 1-methyl-2,4-phenylene, and $R_4$ in (b) is the divalent polypropyleneoxypropylene radical having the formula $-(CHCH_3CH_2O)_{34}CHCH_3CH_2-$. The carbamate G was prepared by mixing together in a glass bottle in the following proportions, 74 grams (0.5 equiv.) of the monomethyl ether of dipropylene glycol and 56.4 g. (0.648 equiv.) of 2,4-toluene diisocyanate. After a slight exotherm had subsided there was added with stirring 148 g. (0.148 equiv.) of a polypropylene glycol of M.W. of 2025 and the mixture left overnight in an oven at about 70° C. The urethane product had a calculated equivalent weight of 429.

The high density foams had a rapid cure rate even though water blown and they were not brittle.

TABLE V

| Foams | R | S |
|---|---|---|
| Ingredients(parts by wt.) | | |
| Polyisocyanate 1 | 35 | 35 |
| Carbamate G (eq.) | 35 (0.08 eq.) | 35 (0.08 eq.) |
| Water (no. of drops) | 4 | 2 |
| L-5340 | 0.5 | 0.5 |
| Catalyst 1 | 1.1 | 1.0 |

Density(pcf)profile with time (minutes:seconds) after mix:

| Time | Density | Time | Density |
|---|---|---|---|
| :22 | 50 | :30 | 51 |
| :55 | 37.7 | :50 | — |
| 1:10 | 30.1 | 1:10 | 19.1 firm |
| 1:35 | 17.7 | | |
| 3:00 | firm | | |

EXAMPLE 6

This example sets forth a comparison of a composition A not in accordance with the present invention with coating compositions B to E inclusive below which are in accordance with the invention and prepared by mixing the listed ingredients, brushing, or dipping the indicated substrates and curing in an oven at the stated conditions.

Composition A 2 gms. of the monomethyl ether of polyethylene glycol of MW 550

5 gms. of xylene 10 gms. of methylethyl ketone 1 drop of Catalyst I (same caty. as in above examples)

1 drop of Catalyst II (same caty. as in above examples)

18 gms. of a diisocyanate prepolymer comprised of the reaction product of 61% w/w of methylenebis(phenyl isocyanate) and 39.5% w/w of a diol derived from caprolactone; isocyanate equiv.=225.

The composition started to react immediately upon mixing, as evidenced by a continuous bubbling, with gelation occurring within 30 seconds. A film or coating could not be cast.

Composition B (pot life over 1 hour)

10 gms. of methylethyl ketone 5 gms. of xylene 2 drops of Catalyst I 1 drop of Catalyst II 5 gms. of Carbamate H[1]

18 gms. of a diisocyanate prepolymer comprised of the reaction product of 61% w/w of methylenebis(phenyl isocyanate) and 39.5% w/w of a polyester diol comprised of 55/45 copolyester of ethylene/butylene adipate; isocyanate equiv.=225

[1]Carbamate H corresponds to formula (II) above wherein n is 0, $m_1$ is 2, $R_1$ is the monovalent radical $CH_3OCH_2CH_2—$, and $R_3$ is 4,4'-methylenebis(phenylene) and was prepared by mixing together in the following proportions 50 g. (0.4 eq.) of methylenebis(phenyl isocyanate), and 36 g. (0.4 eq.) of monoethyl ether of ethylene glycol. The urethane product had a calculated carbamate equivalent weight of 215.

Composition B was brushed on untreated aluminum and untreated steel sheet samples and the coated samples cured in an oven at 180° F. for 15 minutes. The coatings on both samples were water white, clear, flexible, and hard. The coatings could be pulled off the substrates. However, as noted above, neither the aluminum nor steel was pretreated or primed.

Composition C (pot life 1 hour)

This composition was the same as Composition B except that the Carbamate H was replaced by 5 gms. of Carbamate I which corresponds to formula (II) wherein n is 0, $m_1$ is 2, $R_1$ is the monovalent radical $CH_3(OCH_2CH_2)_{\overline{12}}$, and $R_3$ is 4,4'-methylenebis(phenylene) and which was prepared by mixing together in the following proportions 15.9 g. (0.12 eq.) of methylenebis(phenyl isocyanate) and 70 g. (0.12 eq.) of a monomethyl ether of polyethylene glycol of MW 550. The urethane product had a calculated carbamate equivalent weight of 716.

Composition C was brushed on untreated aluminum and untreated steel sheets and the coated samples cured in the oven at 180° F. for 15 minutes. The coatings were flexible, with good adhesion. The coatings had a hardness greater than 2B pencil lead. Testing the hardness of coatings based on the scale of lead pencil hardness and what hardness will scratch the coating, is a standard test used in the coating art.

Composition D (pot life 2–3 minutes)

1.0 gm. of methylethyl ketone 10 gms. of toluene 0.2 g. Catalyst I 0.2 g. Catalyst II 3 gms. of Carbamate J[2]

6 gms. of methylenebis(phenyl isocyanate)

[2]Carbamate J corresponds to formula (III) above wherein n is 0, $m_2$ is 2, $R_1$ is phenyl, and $R_4$ corresponds to the divalent polyethyleneoxyethylene radical having the formula $-(CH_2CH_2O)_{\overline{7}}CH_2CH_2-$ and was prepared by mixing 119 g. (1.0 equiv.) of phenyl isocyanate, and 210 g. (1.0 equiv.) of polyethylene glycol of MW 400 with 1 drop of dibutyltin dilaurate over a one hour period at room temperature.

Composition D was brushed on to one side of an untreated steel panel and cured in the oven at 180° F. for 15 minutes. The coating was clear with a high gloss and was harder than 2B lead pencil.

Composition E (pot life of under 10 minutes)

15 gms. of toluene 0.2 g. of Catalyst I 3.4 g. of Carbamate C (same Carbamate C as in above examples)

13.4 g. of Polyisocyanate I (same polyisocyanate as in above examples)

The clear solution of Composition E was brushed on to untreated steel and aluminum sheets which were cured in the oven at 200° F. for less than 10 minutes. The coating was tack free and hard without being brittle. Adhesion was better on the aluminum than on the steel.

I claim:

1. In a polymer in which the major recurring unit is isocyanurate which polymer comprises the reaction product obtained by bringing together an aromatic polyisocyanate, and a trimerization catalyst, the improvement which comprises incorporating into the polymer a minor amount of a carbamate modifier selected from the group consisting of

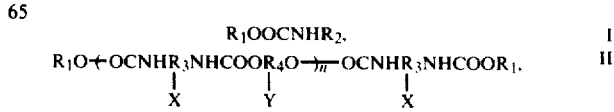

-continued

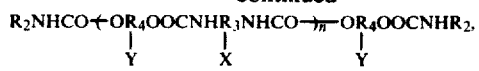

and mixtures thereof; wherein $R_1$ and $R_2$ each independently represents hydrocarbyl; $R_3$ is a polyvalent hydrocarbon radical; $R_4$ is a polyvalent organic radical; n has an average value from 0 to 10; X represents

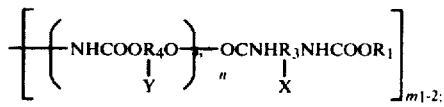

and Y represents

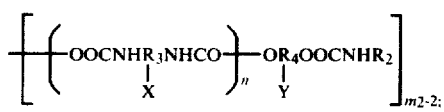

wherein n is defined above, and $m_1$ and $m_2$ represent the valencies of $R_3$ and $R_4$ respectively.

2. The polymer according to claim 1 wherein said carbamate modifier has the formula (I).

3. The polymer according to claim 1 wherein said carbamate modifier has the formula (II).

4. The polymer according to claim 1 wherein said carbamate modifier has the formula (III).

5. A cellular polymer according to claim 1 wherein a blowing agent is employed with the polymer forming ingredients.

6. In a cellular polymer in which the major recurring unit is isocyanurate which polymer comprises the reaction product obtained by bringing together an aromatic polyisocyanate, a trimerization catalyst, and a blowing agent under foam forming conditions, the improvement which comprises incorporating into the foam forming reaction mixture a minor amount of a carbamate modifier having the formula (II) defined in claim 1.

7. The cellular polymer according to claim 6 wherein said carbamate modifier is selected from the group consisting of
  (a) said carbamate modifier (II) wherein n is zero and $m_1$ is 2, and said carbamate corresponds to the formula $R_3(NHCOOR_1)_2$; and
  (b) said carbamate modifier (II) wherein n has an average value of from about 0.5 to about 5.0, and both $m_1$ and $m_2$ have the value 2; and mixtures of (a) and (b).

8. The cellular polymer according to claim 6 wherein said polyvalent hydrocarbon radical $R_3$ is an aromatic divalent radical.

9. A cellular polymer in which the major recurring unit is isocyanurate which polymer comprises the reaction product obtained by bringing together under foam forming conditions:
  A. a polymethylene poly(phenyl isocyanate);
  B. a trimerization catalyst;
  C. a blowing agent; and
  D. a minor amount of a carbamate modifier selected from the group consisting of
    (a) $R_3(NHCOOR_1)_2$;
    (b) $R_1O(OCNHR_3NHCOOR_4O)_nOCNHR_3NHCOOR_1$; and mixtures of (a) and (b); wherein $R_1$ is hydrocarbyl; $R_3$ is a divalent aromatic hydrocarbon radical; $R_4$ is a divalent polyalkyleneoxyalkylene radical; and n has an average value from about 0.5 to about 5.0.

10. A cellular polymer according to claim 9 wherein said carbamate modifier has the formula $R_3(NHCOOR_1)_2$ wherein $R_3$ is

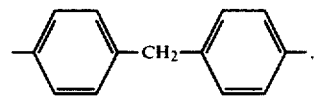

and $R_1$ is $+CH_2CH_2O)_{7.5}CH_3$.

11. A cellular polymer according to claim 9 wherein said carbamate modifier has the formula $R_3(NHCOOR_1)_2$ wherein $R_3$ is

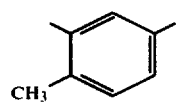

and $R_1$ is $+CH_2CH_2O)_{7.5}CH_3$.

12. A cellular polymer according to claim 9 wherein said carbamate modifier is a mixture of $R_3(NHCOOR_1)_2$, and $R_1O(OCNHR_3NHCOOR_4O)_nOCNHR_3NHCOOR_1$ wherein

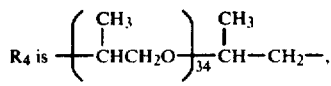

and n has an average value of about 1.5.

13. A film or coating composition comprising a polymer in accordance with claim 1.

14. A molded composition comprising an article molded from a polymer in accordance with claim 1.

* * * * *